May 10, 1932.  E. E. CANNON  1,857,352
MECHANICAL MOVEMENT
Filed June 12, 1931
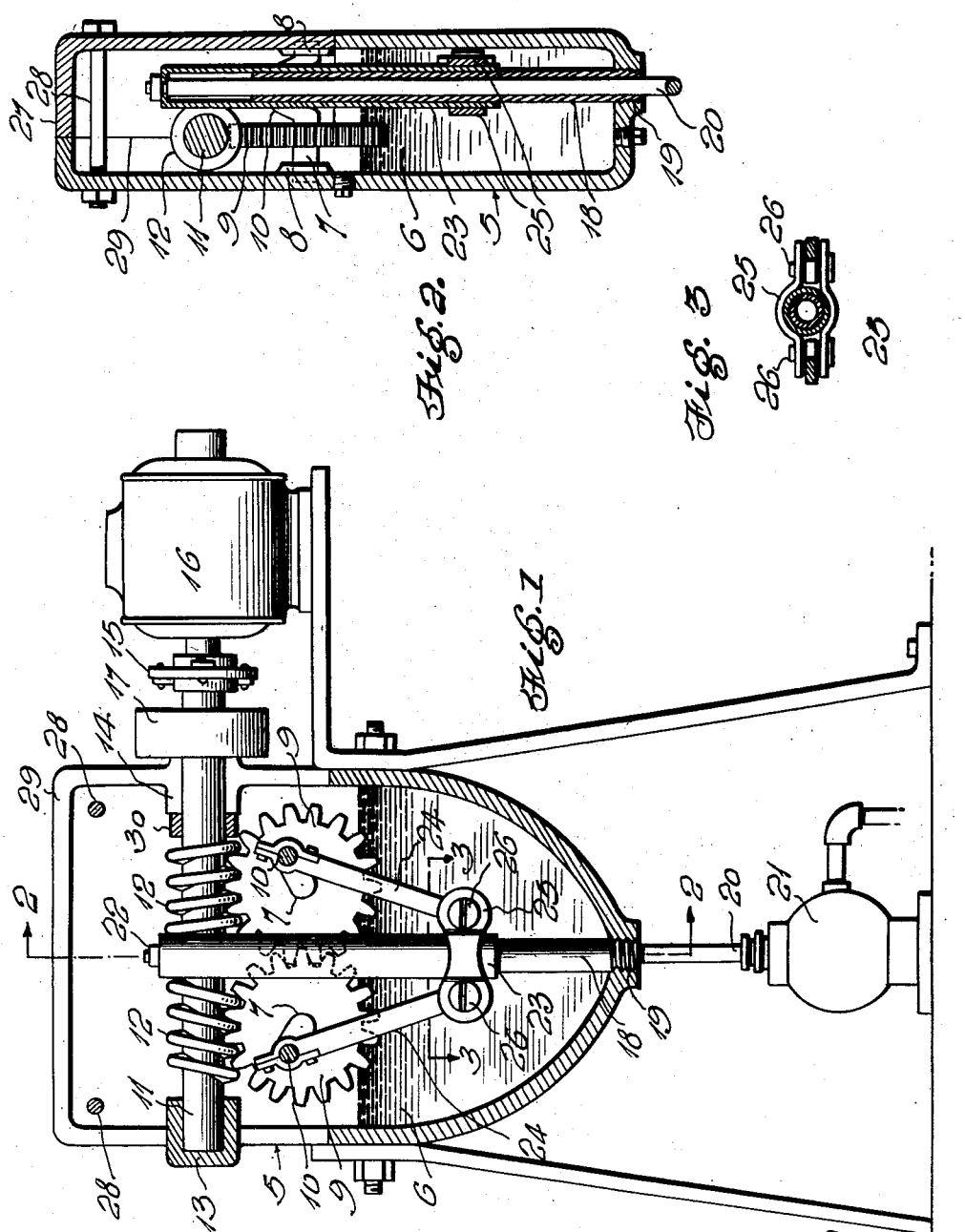
Inventor
Elmer E. Cannon
Witness
H. Woodard
By H. B. Willson &co
Attorneys.

Patented May 10, 1932

1,857,352

UNITED STATES PATENT OFFICE

ELMER E. CANNON, OF WAUKOMIS, OKLAHOMA

MECHANICAL MOVEMENT

Application filed June 12, 1931. Serial No. 543,937.

The invention aims to provide a new and improved mechanical movement designed for converting rotary into reciprocatory motion and adapted primarily for use as a pump jack.

In carrying out the above end, two crank shafts which are connected by pitman rods with a reciprocating member, are provided with gears which are driven by oppositely pitched worms upon a drive shaft, and another aim is to provide a novel relation of parts whereby all of them which are subjected to wear, are confined in an oil-containing casing and are effectively lubricated from the oil therein.

A further object is to provide a novel relation of the above mentioned elements in which the two gears on the crank shaft are not only in mesh with the above-mentioned worms, but are directly in mesh with each other, thereby more uniformly distributing strain.

With the foregoing and minor objects in view, the invention resides in the novel subject matter hereinafter described and claimed, description being accomplished by reference to the accompanying drawings.

Fig. 1 is a vertical section through a pump jack constructed in accordance with the invention showing it operatively connected with a pump.

Fig. 2 is a vertical sectional view at right angles to Fig. 1, as indicated by line 2—2 thereof.

Fig. 3 is a fragmentary horizontal section on line 3—3 of Fig. 1.

In the drawings above briefly described, only one form of construction has been illustrated, but it is to be understood that within the scope of the invention as claimed, variations may be made.

The numeral 5 denotes a vertically elongated casing adapted to contain a quantity of oil 6. Mounted within this casing, preferably above the oil level, are two parallel crank shafts 7 whose ends may be supported by any preferred bearings 8. Each crank shaft is provided with a gear 9 and with a crank 10, and the two gears 9 are in mesh with each other. A drive shaft 11 at right angles to the crank shafts 7, is provided with two oppositely pitched worms 12 which mesh with the gears 9 respectively. Suitable bearings 13 and 14 are provided for the shaft 11 and this shaft may be driven in any desired way. I have shown it directly coupled at 15 to the shaft of an electric motor 16, but I also prefer to provide the shaft 11 with a pulley 17 so that it may be driven by a belt if desired.

A vertical tube 18 is secured at 19 in an opening in the lower end of the casing 5, said tube being imperforate and extending to a point considerably above the lower edges of the gears 9, so that the oil level in the casing may reach said gears without discharging through the tube, said tube being of course imperforate. Passing vertically through the tube 18, is a reciprocatory rod 20 which may be the pump rod of a pump 21. The upper end of this rod 20 is suitably secured at 22 to a sleeve 23 which slidably surrounds the tube 18, said sleeve extending downwardly beyond the lower edges of the gears 9 so that it may dip into the oil 6, thereby insuring effective lubrication of the contacting faces of said sleeve and the tube 18.

Pitman rods 24 are connected with the cranks 10 respectively and with the sleeve 23, said sleeve being preferably provided with a clamp 25 to which the rods are pivoted at 26.

For ease in assembly and for access to movable parts if repairs be necessary, the casing 5 is preferably provided with a removable section 27 held in place by suitable fasteners 28 and abutting the major portion of the casing on a line 29 which intersects one or both of the bearings 13—14. In the present showing, the bearing 13 is formed entirely upon the main portion of the casing 5, but the bearing 14 is split and formed half on each casing section. I have shown the bearing 13 so constructed as to prevent sliding of the shaft 11 in one direction, and to prevent such movement in the other direction, I have illustrated a thrust collar 30 interposed between the bearing 14 and the adjacent worm 12. The thrust surfaces of the bearings however, receive practically no thrust when the mechanism is in operation, for any tendency of one of the worms 12 to slide the shaft 11 in one direction, is counteracted by the tendency of the other worm to slide said shaft in the other direction. Hence, there is no necessity of expensive or efficient end thrust bearings as usually employed in connection with a worm.

As all parts operate continually in a bath of oil, unusually smooth operation is effected and little wear occurs. Moreover, due to the constant meshing of the gears 9 with each other in addition to meshing with the worms 12, strain is equally distributed and consequently the structure as a whole is not subjected to such stresses as to be injurious.

I claim:—

1. A mechanical movement comprising an oil-containing casing, two parallel horizontal shafts mounted in said casing and each having a crank and a gear, a drive shaft mounted horizontally in said casing at right angles to said crank shafts and having two oppositely pitched worms meshing with said gears respectively, a vertical imperforate tube secured to and rising rigidly from the bottom of said casing, said tube extending to a point above the lower edges of said gears allowing the oil level in the casing to reach said gears without discharging through said tube, a rod passing through said tube, a sleeve in the casing slidably surrounding said tube and extending below said lower edges of said gears, whereby the contacting surfaces of said tube and sleeve will be lubricated by the casing-contained oil, said sleeve having its upper end secured to the upper end of said rod, and pitman rods in said casing connected to said cranks and to said sleeve.

2. A mechanical movement comprising an oil-containing casing, two parallel horizontal shafts mounted in said casing and each having a crank and a gear, the two gears being in mesh with each other, a drive shaft mounted horizontally in said casing at right angles to said crank shafts and having two oppositely pitched worms meshing with said gears respectively, a vertical imperforate tube secured to and rising rigidly from the bottom of said casing, said tube extending to a point above the lower edges of said gears allowing the oil level in the casing to reach said gears without discharging through said tube, a rod passing through said tube, a sleeve in the casing slidably surrounding said tube and extending below said lower edges of said gears, whereby the contacting surfaces of said tube and sleeve will be lubricated by the casing-contained oil, said sleeve having its upper end secured to the upper end of said rod, and pitman rods in said casing connected to said cranks and to said sleeve.

In testimony whereof I affix my signature.

ELMER E. CANNON.